(12) United States Patent
Ding

(10) Patent No.: US 10,663,718 B2
(45) Date of Patent: *May 26, 2020

(54) ADJUSTABLE MIRROR SYSTEM

(71) Applicant: Thunder Power New Energy Vehicle Development Company Limited, Central (HK)

(72) Inventor: Jia-Wei Ding, Taipei (TW)

(73) Assignee: Thunder Power New Energy Vehicle Development Company Limited, Central (HK)

(*) Notice: Subject to any disclaimer, the term of this patent is extended or adjusted under 35 U.S.C. 154(b) by 0 days.

This patent is subject to a terminal disclaimer.

(21) Appl. No.: 15/943,712

(22) Filed: Apr. 3, 2018

(65) Prior Publication Data

US 2018/0224654 A1 Aug. 9, 2018

Related U.S. Application Data

(63) Continuation of application No. 15/291,979, filed on Oct. 12, 2016, now Pat. No. 9,964,756, which is a continuation of application No. 14/979,499, filed on Dec. 27, 2015, now Pat. No. 9,541,753.

(51) Int. Cl.
*G02B 26/08* (2006.01)
*B60R 1/00* (2006.01)
*B60R 1/08* (2006.01)

(52) U.S. Cl.
CPC ............ *G02B 26/0825* (2013.01); *B60R 1/00* (2013.01); *B60R 1/08* (2013.01)

(58) Field of Classification Search
None
See application file for complete search history.

(56) References Cited

U.S. PATENT DOCUMENTS

| 6,021,153 A | * | 2/2000 | Okada | G02B 26/0825 372/107 |
| 9,199,577 B1 | * | 12/2015 | Messina | B60R 1/0607 |
| 9,541,753 B1 | * | 1/2017 | Ding | G02B 26/0825 |
| 9,964,756 B2 | * | 5/2018 | Ding | B60R 1/00 |
| 2005/0200984 A1 | * | 9/2005 | Browne | B60R 1/08 359/846 |

* cited by examiner

*Primary Examiner* — Jennifer D. Carruth
(74) *Attorney, Agent, or Firm* — Kilpatrick Townsend & Stockton

(57) ABSTRACT

An adjustable mirror system, including a flexible mirror configured to change curvature, a shaft coupled to the mirror, a cylinder, wherein the cylinder is configured to receive the shaft and a fluid, and an actuator coupled to the housing, wherein the actuator increases and decreases the pressure of the fluid in the cylinder to drive the shaft and change the curvature of the flexible mirror.

19 Claims, 3 Drawing Sheets

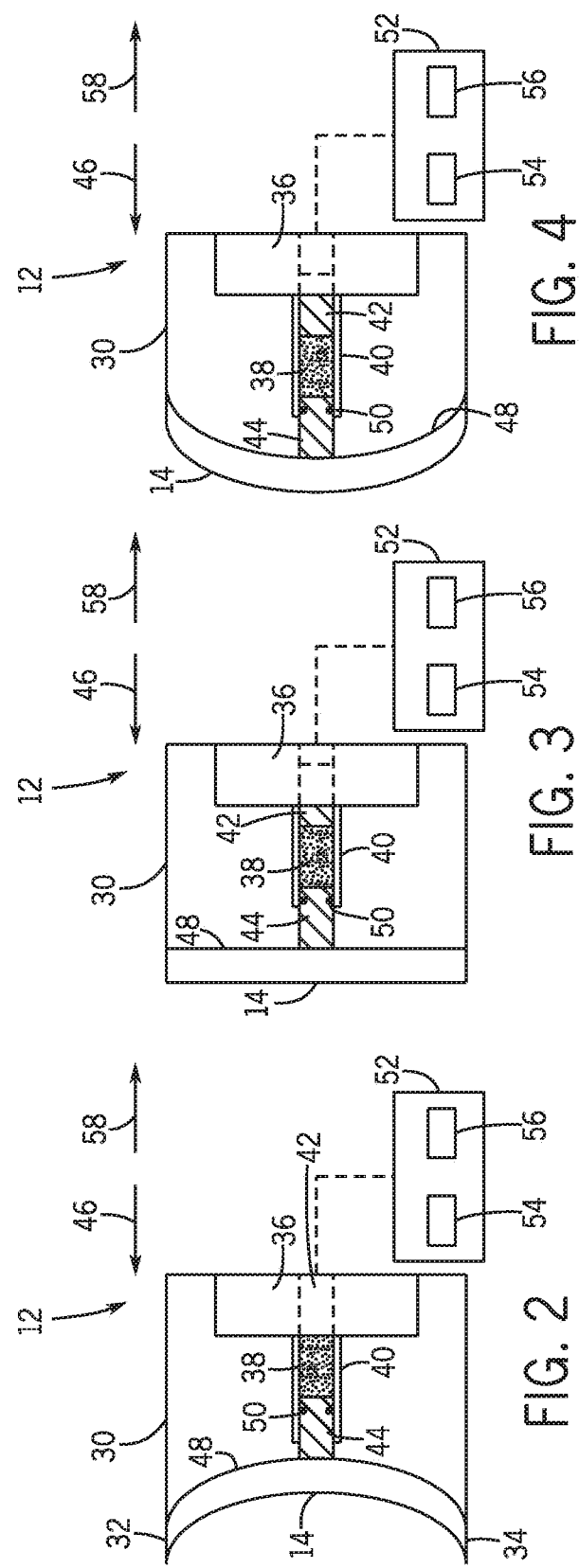

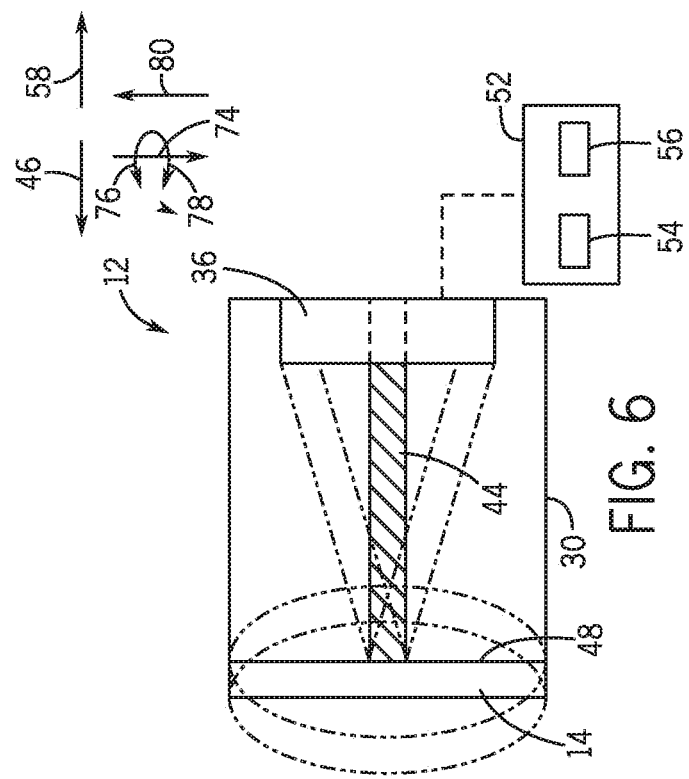
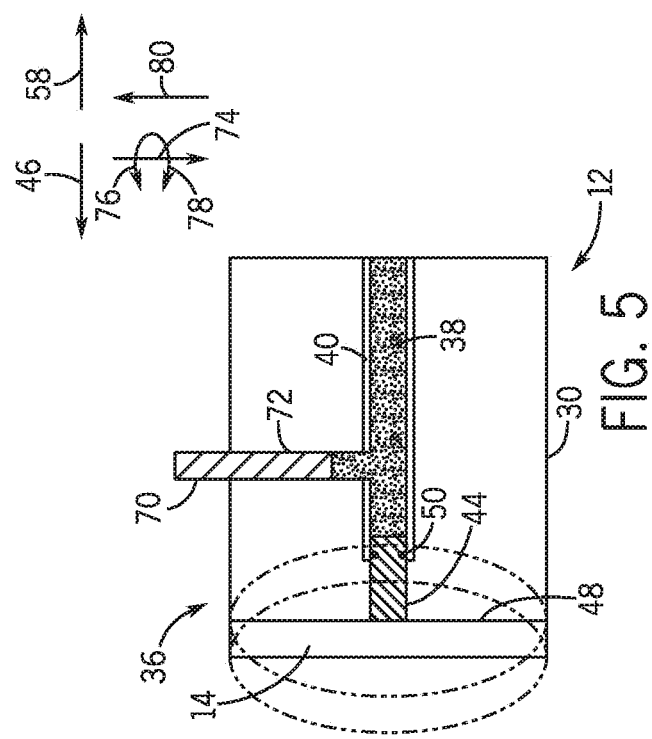

ADJUSTABLE MIRROR SYSTEM

CROSS-REFERENCE TO RELATED APPLICATION

The present application is a continuation of U.S. Nonprovisional patent application Ser. No. 15/291,979, filed Oct. 12, 2016, which is a continuation of U.S. Nonprovisional patent application Ser. No. 14/979,499, filed Dec. 27, 2015, now U.S. Pat. No. 9,541,753, issued Jan. 10, 2018, the entire disclosures of which are hereby incorporated by reference for all purposes.

FIELD OF THE INVENTION

The disclosure generally relates to a vehicle mirror system.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Vehicles typically have multiple mirrors that increase a driver's situational awareness. For example, a vehicle may have rearview and side mirrors. In operation, a driver may use these mirrors for parking, backing up, changing lanes, etc.

SUMMARY OF THE INVENTION

The present disclosure is directed to an adjustable mirror system. The adjustable mirror system may include a flexible mirror configured to change curvature, a shaft coupled to the mirror, and a cylinder. In operation, the cylinder is configured to receive the shaft and a fluid. An actuator may couple to the housing to increase and decrease the pressure of the fluid in the cylinder, which drives the shaft and changes the curvature of the flexible mirror.

An aspect of the disclosure includes an adjustable mirror system with a flexible mirror. The flexible mirror capable of changing curvature. A shaft couples to the flexible mirror, and a cylinder receives the shaft, wherein the shaft moves within the cylinder to change the curvature of the flexible mirror.

Another aspect of the disclosure includes a vehicle adjustable mirror system that includes a vehicle with an adjustable mirror system. The adjustable mirror system includes a flexible mirror that changes curvature, a shaft coupled to the mirror, and a housing that couples to the flexible mirror. In operation, the shaft moves within the housing to change the curvature of the flexible mirror.

BRIEF DESCRIPTION OF THE DRAWINGS

Various features, aspects, and advantages of the present invention will be better understood when the following detailed description is read with reference to the accompanying figures in which like characters represent like parts throughout the figures, wherein:

FIG. 2 is a cross-sectional side view of an embodiment of an adjustable mirror system in a concave position;

FIG. 3 is a cross-sectional side view of an embodiment of an adjustable mirror system in a flat position;

FIG. 4 is a cross-sectional side view of an embodiment of an adjustable mirror system in a convex position;

FIG. 5 is a cross-sectional side view of an embodiment of an adjustable mirror system; and FIG. 6 is a cross-sectional side view of an embodiment of an adjustable mirror system.

DETAILED DESCRIPTION

Figure 1:
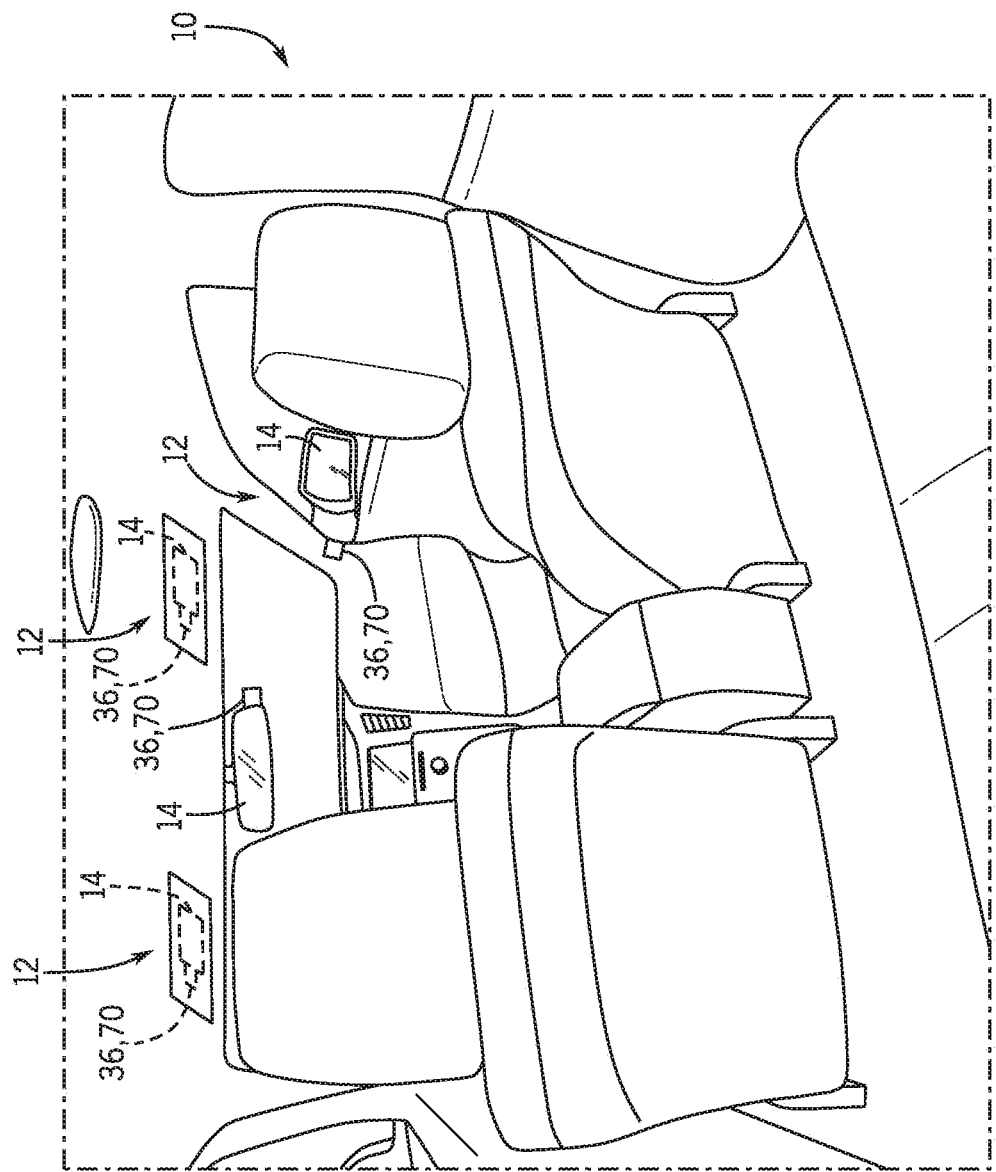
FIG. 1 is an interior view of an embodiment of a vehicle with an adjustable mirror system.

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments discussed below include an adjustable mirror system with a flexible mirror capable of changing between convex, flat, and concave positions. The adjustable mirror system may be included in a vehicle to provide a user with greater flexibility in viewing objects. For example, the adjustable mirror system may enable a user to increase their field of vision, magnify objects, or view objects with minimal or no distortions. As will be discussed in detail below, the adjustable mirror system may adjust the curvature of the flexible mirror using a manual and/or powered actuator.

FIG. 1 is an interior view of an embodiment of a vehicle 10 with an adjustable mirror system 12. As illustrated, the vehicle 10 may include adjustable mirror systems 12 for use as rear view mirrors, side mirrors, vanity mirrors (e.g., vanity mirrors in sun visors), etc. In operation, the adjustable mirror system 12 enables a user to change a curvature of a flexible mirror 14. For example, the adjustable mirror system 12 may transition the flexible mirror 14 between convex, flat, and concave positions.

These different positions may assist a user in viewing objects inside and outside of the vehicle 10. For example, the user may want to increase their field of vision. In these situations, the user may use the adjustable mirror system 12 to transition a flexible mirror 14 to a convex position. In the convex position, the user may be able to see more of the rear part of the vehicle and/or around the exterior of the vehicle. This may enable a user to better see what kids or other passengers are doing in the back seats, or to view traffic around the vehicle 10. In another situation, the user may use the adjustable mirror system 12 to change the flexible mirror 14 to a concave position in order to magnify objects. For example, a user may change the flexible mirror 14 into a concave position to magnify a user's face (e.g., to shave, to apply makeup, etc.). In still another situation, a user may use the adjustable mirror system 12 to change the flexible mirror to a flat position. In the flat position, a user may better perceive the actual distances of objects; instead of the distorted views from concave and convex positions of the flexible mirror 14. In some embodiments, the flexible mirror 14 may be include a material such as a reflective shape memory material and/or a reflective flexible material (e.g., metal) that enables the flexible mirror to change curvature. In some embodiments, the flexible mirror 14 may include a flexible substrate (e.g., metal, plastic, etc.) with a reflective coating.

FIG. 2 is a cross-sectional side view of an embodiment of an adjustable mirror system 12 in a concave position. The adjustable mirror system 12 includes a mirror housing 30 that receives the flexible mirror 14. As illustrated, an outer edge 32 of the flexible mirror 14 may couple to the mirror housing 30 providing an attachment point 34 that enables the flexible mirror 14 to transition between concave, flat, and convex positions.

In FIG. 2, the flexible mirror 14 is in a concave position (e.g., unactuated position), In order to actuate the flexible mirror 14, the adjustable mirror system 12 includes an actuator 36 (e.g., manual and/or powered actuator). The actuator 36 in FIG. 2 is a powered actuator 36 (e.g., pump, motor, etc.) that transitions the flexible mirror 14 between concave, flat, convex positions. For example, the powered actuator 36 may increase the pressure of a fluid 38 within a cylinder 40 by either pumping fluid 38 into the cylinder 40 or by driving a piston 42 into the cylinder 40. As the pressure of the fluid 38 increases in the cylinder 40, the fluid drives a shaft 44 in axial direction 46. The shaft 44, which couples to the rear 48 of the flexible mirror 14, then drives the flexible mirror 14. As the shaft 44 moves in axial direction 46 the flexible mirror 14 transitions from a concave position to a flat position (seen in FIG. 3) and then to a convex position (seen in FIG. 4).

The adjustable mirror system 12 blocks the fluid 38 from escaping from the cylinder 40 using one or more seals 50 (e.g., gasket, O-ring). For example, the adjustable mirror system 12 may include 1, 2, 3, 4, 5, or more seals 50. The seals 50 may couple to the shaft 44 and/or to the cylinder 40 to form a seal between the shaft 44 and the cylinder 40.

In some embodiments, the position of the flexible mirror 14 may be controlled with a controller 52. The controller 52 may include one or more processors 54 that execute instructions stored on one or more memories 56. For example, the controller 52 may receive a signal from a user (e.g., through buttons, knobs, touchscreen, etc.) that indicates the desired shape of the flexible mirror 14 (e.g., concave, flat, or convex). When the controller 52 receives the signal, the processor 54 executes instructions stored on the memory 56 to control the actuator 36, which then transitions the flexible mirror 14 to the desired shape.

FIG. 3 is a cross-sectional side view of an embodiment of an adjustable mirror system 12 in a flat position. As explained above, in order to transition the flexible mirror 14 from the concave position to the flat position, the actuator 36 drives the piston 42 in axial direction 46. As the piston 42 moves in axial direction 46, the piston 42 increases the pressure of the fluid 38 driving the shaft 44 in axial direction 46 until the flexible mirror 14 reaches the flat position.

FIG. 4 is a cross-sectional side view of an embodiment of an adjustable mirror system 12 in a convex position. If the user wants, the flexible mirror 14 in a convex position the actuator 36 continues to drive the piston 42 in axial direction 46. As the piston 42 moves in axial direction 46, the piston 42 increases the pressure of the fluid 38 driving the shaft 44 in axial direction 46. The flexible mirror 14 then transitions from the flat position to the convex position. In order for the flexible mirror 14 to return to the concave position, the actuator 36 withdraws the piston 42. The decrease in pressure enables the flexible mirror 14 to return to the original concave position (seen in FIG. 2). For example, the flexible mirror 14 may be made out of a resilient material (e.g., shape memory material) that returns to its original shape (e.g., concave) once a biasing force is removed. In some embodiments, when the piston 42 is withdrawn a vacuum may form in the cylinder 40 that pulls the shaft 44 and/or enables atmospheric pressure to drive the flexible mirror 14 in direction 58. As the flexible mirror 14 moves in axial direction 58, the flexible mirror 14 returns to the flat or concave position.

FIG. 5 is a cross-sectional side view of an embodiment of an adjustable mirror system 12 with a manual actuator 36. The manual actuator 36 may be a shaft 70 (e.g., threaded shaft) that passes through an aperture 72 in the mirror housing 30. The aperture 72 is fluidly coupled to the cylinder 40 enabling the shaft 70 to influence the pressure of the fluid 38. For example, to increase the pressure of the fluid 38 within the cylinder 40, the shaft 70 may be driven (e.g., threaded in circumferential directions 76, 78) into the aperture 72 in direction 74. The further the shaft 70 passes through the aperture 72 the more fluid 38 is displaced. The displaced fluid 38 increases the pressure within the cylinder 40 driving the shaft 44 in axial direction 46. As the shaft 44 moves in axial direction 46, the flexible mirror 14 changes from the flat position to the convex position. Likewise, to return the flexible mirror 14 to the flat position, the shaft 70 may be withdrawn in axial direction 80. When the shaft 70 moves in axial direction 80, fluid 38 is able to enter the aperture 72, which decreases the pressure within the cylinder 40. In some embodiments, the flexible mirror 14 may be made out of a resilient material (e.g., shape memory material) that returns to its original shape (e.g., concave) once a biasing force is removed. In some embodiments, when the shaft 70 is withdrawn a vacuum may form in the cylinder 40 that pulls the shaft 44 and/or enables atmospheric pressure to drive the flexible mirror 14 in direction 58. As the flexible mirror 14 moves in axial direction 58, the flexible mirror 14 returns to the flat or concave position.

FIG. 6 is a cross-sectional side view of an embodiment of an adjustable mirror system 12. In some embodiments, instead of a fluid within the mirror housing 30, the shaft 44 may be moved in axial directions 46 and 58 to change the position of the flexible mirror 14. For example, the shaft 44 may couple to the actuator 36, which drives movement of the shaft 44. As the shaft 44 moves axially, the flexible mirror 14 transitions between concave, flat, and convex positions. In some embodiments, the actuator 36 may also move the shaft 44 in other directions. For example, the actuator 36 may move the shaft in axial directions 74 and 80, among others, to adjust the view of the flexible mirror 14. While a powered actuator 36 is illustrated, in some embodiments a user may manually adjust the shaft 44. For example, the shaft 44 may be a threaded shaft that rotates with user input to change the position of the shaft 44, thereby transitioning the flexible mirror 14 between concave, flat, and convex positions.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An adjustable vehicle mirror system, comprising:
 a housing;
 a flexible mirror having a configurable curvature, wherein an outer edge of the flexible mirror directly couples to the housing;
 a cylinder operably coupled to the flexible mirror, wherein the cylinder is configured to receive a fluid; and
 an actuator coupled to the housing, wherein the actuator is configured to alter a pressure of the fluid in the cylinder to configure the curvature of the mirror.

2. The system of claim 1, wherein the actuator is a manual actuator.

3. The system of claim 1, wherein the actuator is a powered actuator.

4. The system of claim 3, wherein the powered actuator is a pump.

5. The system of claim 3, wherein the powered actuator is a motor that drives an actuator shaft.

6. The system if claim 1, wherein the flexible mirror transitions between a concave, a convex position, and a flat position.

7. The system of claim 1, wherein the outer edge defines a perimeter, and wherein the entire perimeter of the outer edge couples to the housing.

8. The system of claim 1, comprising a controller configured to control the actuator to transition the flexible mirror.

9. The system of claim 1, wherein the flexible mirror comprises a shape memory material.

10. The system of claim 1, wherein the flexible mirror comprises a substrate with a reflective coating.

11. An adjustable vehicle mirror system, comprising:
 a housing;
 a flexible mirror having a configurable curvature, wherein an outer edge of the flexible mirror directly couples to the housing;
 a shaft coupled to the flexible mirror; and
 wherein the shaft is configured to alter the curvature of the mirror.

12. The system of claim 11, comprising a cylinder configured to receive the shaft.

13. The system of claim 11, wherein the shaft is threaded.

14. The system of claim 11, comprising a powered actuator coupled to the shaft.

15. The system of claim 14, comprising a controller coupled to the powered actuator and configured to control the powered actuator to drive the shaft.

16. The system of claim 11, comprising a vehicle with the adjustable mirror system.

17. The system of claim 11, wherein the flexible mirror comprises a shape memory material.

18. The system of claim 11, wherein the flexible mirror comprises a substrate with a reflective coating.

19. An adjustable vehicle mirror system, comprising:
 a vehicle;
 an adjustable mirror system coupled to the vehicle, comprising:
  a housing;
  a flexible mirror having a configurable curvature, wherein an outer edge of the flexible mirror directly couples to the housing;
  a cylinder operably coupled to the flexible mirror, wherein the cylinder is configured to receive a fluid; and
  an actuator coupled to the housing, wherein the actuator is configured to alter a pressure of the fluid in the cylinder to configure the curvature of the mirror.

* * * * *